(12) United States Patent
Lee (10) Patent No.: US 10,300,854 B2
(45) Date of Patent: May 28, 2019

(54) APPARATUS AND METHOD OF GENERATING TOP-VIEW IMAGE

(71) Applicant: Hyundai Mobis Co., Ltd., Seoul (KR)

(72) Inventor: Seong Soo Lee, Jincheon-gun (KR)

(73) Assignee: Hyundai Mobis Co., Ltd., Seoul (KR)

(*) Notice: Subject to any disclaimer, the term of this patent is extended or adjusted under 35 U.S.C. 154(b) by 68 days.

(21) Appl. No.: 15/630,896

(22) Filed: Jun. 22, 2017

(65) Prior Publication Data

US 2018/0056873 A1  Mar. 1, 2018

(30) Foreign Application Priority Data

Aug. 31, 2016 (KR) .................. 10-2016-0111632

(51) Int. Cl.
*B60R 1/00* (2006.01)
*G06T 7/33* (2017.01)
*G06T 7/73* (2017.01)
*G06T 7/536* (2017.01)

(52) U.S. Cl.
CPC .............. *B60R 1/002* (2013.01); *G06T 7/33* (2017.01); *G06T 7/536* (2017.01); *G06T 7/73* (2017.01); *G06T 2207/20212* (2013.01); *G06T 2207/30244* (2013.01); *G06T 2207/30252* (2013.01); *G06T 2207/30256* (2013.01)

(58) Field of Classification Search
CPC .......... B60R 1/002; G06T 7/536; G06T 7/73; G06T 7/33; G06T 2207/20212; G06T 2207/30244; G06T 2207/30252; G06T 2207/30256

See application file for complete search history.

(56) References Cited

U.S. PATENT DOCUMENTS

2003/0030546 A1* 2/2003 Tseng .................. B60R 1/00 340/425.5
2017/0136948 A1* 5/2017 Sypitkowski ........... B60R 1/00

FOREIGN PATENT DOCUMENTS

JP  2004-020398  1/2004

* cited by examiner

*Primary Examiner* — Michael E Teitelbaum
(74) *Attorney, Agent, or Firm* — H.C. Park & Associates, PLC (57) ABSTRACT

Provided is a method of generating a top-view image. The method includes: obtaining an input image by photographing a peripheral road surface of the vehicle by using a camera when a vehicle is driving, detecting at least two lanes from the input image, detecting a vanishing point at which the at least two lanes intersect, calculating a first rotation angle of the camera by using the vanishing point, calculating a second rotation angle of the camera for converting the input image into a top-view image represented in a top-view image coordinate system, based on the first rotation angle, and rotation-converting the input image by using the second rotation angle to generate the top-view image.

9 Claims, 6 Drawing Sheets

APPARATUS AND METHOD OF GENERATING TOP-VIEW IMAGE

CROSS-REFERENCE TO RELATED APPLICATION

This application claims priority from and the benefit of Korean Patent Application No. 10-2016-0111632, filed on Aug. 31, 2016, which is hereby incorporated by reference for all purposes as if fully set forth herein.

BACKGROUND

Field

Exemplary embodiments relate to an apparatus and method of generating a top-view image, and more particularly, to an apparatus and method of generating a top-view image, which generate a top-view image by automatically compensating for a camera tolerance when a vehicle is driving on a road.

Discussion of the Background

A top-view image generating apparatus is an apparatus which converts a front image, a rear image, a left image, and a right image, obtained from four cameras respectively installed in a front mirror, both side mirrors, and a trunk, into one top-view image having a viewpoint seen from above a vehicle, and is referred to as an around view monitoring (AVM) system.

The top-view image generating apparatus uses an image registration processing technique which converts four images, including a front image, a rear image, a left image, and a right image, into one top-view image, and the display quality of a top-view image is determined by registration based on the image registration processing technique.

After a vehicle with cameras installed therein is released, a new camera tolerance occurs in each of the cameras due to a vibration of the vehicle which occur when the vehicle is driving, repeatedly folding of side mirrors, and repeatedly opening/closing of a trunk, and an accumulation of the camera tolerance decreases a registration of a top-view image, causing a degradation in display quality of the top-view image.

In order to compensate for the camera tolerance, in the related art, a driver directly visits a repair shop where professional compensates for a camera tolerance, which may cause an inconvenience for drivers and a cost increase due to periodical visiting of repair shops.

The above information disclosed in this Background section is only for enhancement of understanding of the background of the inventive concept, and, therefore, it may contain information that does not form the prior art that is already known in this country to a person of ordinary skill in the art.

SUMMARY

Accordingly, exemplary embodiments of the present invention provide an apparatus and method of generating a top-view image, which when a vehicle is driving on a road, estimate a camera rotation angle for compensating for a camera tolerance in real time and generate a top-view image by using the estimated camera rotation angle without directly visiting a repair shop.

Additional aspects will be set forth in the detailed description which follows, and, in part, will be apparent from the disclosure, or may be learned by practice of the inventive concept.

In addition to the aforesaid objects of the present invention, other features and advantages of the present invention will be described below, but will be clearly understood by those skilled in the art from descriptions below.

In an exemplary embodiment, a method of generating a top-view image includes: obtaining an input image by photographing a peripheral road surface of a vehicle by using a camera when the vehicle is driving; detecting at least two lanes from the input image; detecting a vanishing point at which the at least two lanes intersect; calculating a first rotation angle of the camera by using the vanishing point; calculating a second rotation angle of the camera for converting the input image into a top-view image represented in a top-view image coordinate system, based on the first rotation angle; and rotation-converting the input image by using the second rotation angle to generate the top-view image.

In another exemplary embodiment, an apparatus for generating a top-view image includes: a camera obtaining input images by photographing a peripheral road surface of a vehicle when the vehicle is driving; a lane detector configured to detect at least two lanes from each of the input images; a vanishing point detector configured to detect a vanishing point at which the at least two lanes intersect; a rotation angle calculator configured to calculate a rotation angle for converting each of the input images into an image corresponding to a top-view viewpoint by using the vanishing point; an image rotation unit configured to rotation-convert the input images by using the rotation angle; and an image synthesizer configured to synthesize the input images rotation-converted at the rotation angle to generate a top-view image.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

Moreover, each of terms such as " . . . unit", " . . . apparatus" and "module" described in specification denotes an element for performing at least one function or operation.

It will be understood that although the terms including an ordinary number such as first or second are used herein to describe various elements, these elements should not be limited by these terms. These terms are only used to distinguish one element from another element. For example, a first element may be referred to as a second element without departing from the spirit and scope of the present invention, and similarly, the second element may also be referred to as the first element.

An exemplary embodiment has a technical feature where a rotation angle of a camera is estimated by using various mark lines marked on a road surface for compensating for a camera tolerance in real time when a vehicle is driving on a road, even without visiting a repair shop.

Moreover, an exemplary embodiment has a technical feature where a front image, a rear image, a left image, and a right image are rotation-converted into a front top-view image, a rear top-view image, a left top-view image, and a right top-view image by using the estimated rotation angle of the camera, and one top-view image is generated by synthesizing (or registering) the rotation-converted front top-view image, rear top-view image, left top-view image, and right top-view image.

Hereinafter, exemplary embodiments will be described in detail with reference to the accompanying drawings.

Figure 1:
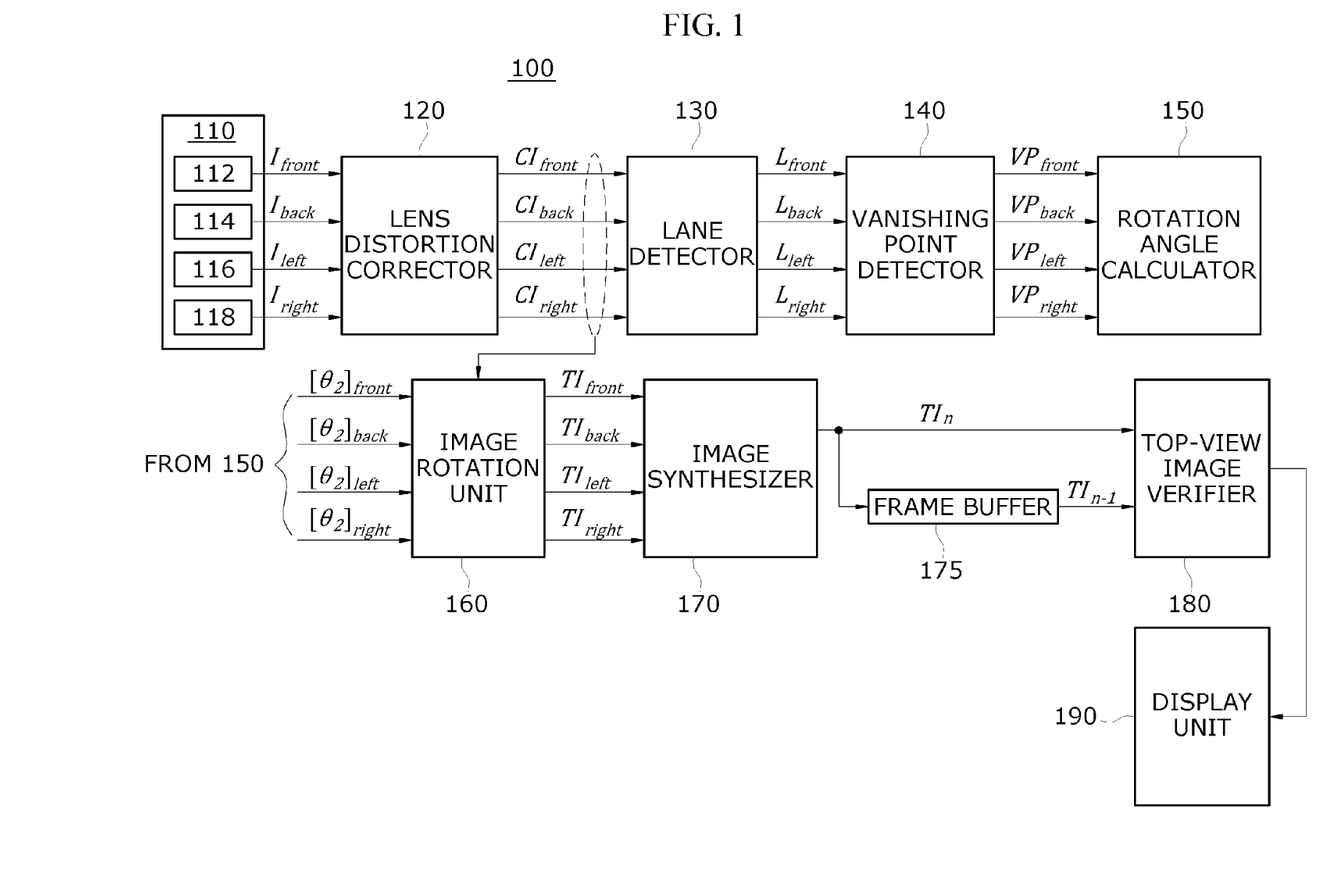
FIG. 1 is a function block diagram of a top-view image generating apparatus according to an exemplary embodiment.

FIG. 1 is a function block diagram of a top-view image generating apparatus 100 according to an exemplary embodiment.

Referring to FIG. 1, the top-view image generating apparatus 100 according to an exemplary embodiment of the present invention may include a camera 110, a lens distortion corrector 120, a lane detector 130, a vanishing point (VP) detector 140, a rotation angle calculator 150, an image rotation unit 160, an image synthesizer 170, a frame buffer 175, a top-view image verifier 180, and a display unit 190, for estimating a rotation angle of a camera by using various mark lines marked on a road surface to generate a top-view image from the estimated rotation angle.

The camera 110 may be an element that photographs a 360-degree peripheral road surface around a vehicle, and may include a front camera 112, a rear camera 114, a left camera 116, and a right camera 118. The front camera 112 may photograph a front road surface of the vehicle to generate a front image $I_{front}$, and the rear camera 114 may photograph a rear road surface of the vehicle to generate a rear image $I_{back}$. The left camera 116 may photograph a left road surface of the vehicle to generate a left image $I_{left}$, and the right camera 118 may photograph a right road surface of the vehicle to generate a right image $I_{right}$. Each of the cameras 112, 114, 116, and 118 may include a wide lens for photographing the 360-degree peripheral road surface around the vehicle, and may be installed in the vehicle in order for its own optical axis not to be parallel to a road surface.

The lens distortion corrector 120 may be configured to correct distortion of objects (for example, various mark lines marked on the road surface) included in the images $I_{front}$, $I_{back}$, $I_{left}$, and $I_{right}$ due to a wide viewing angle characteristic of the wide lens. The lens distortion corrector 120 may correct the front, rear, left, and right images respectively input from the cameras 112, 114, 116, and 118 by using a lens distortion model or a lens distortion correction algorithm to generate front, rear, left, and right images $CI_{front}$, $CI_{back}$, $CI_{left}$, and $CI_{right}$ where lens distortion has been corrected. The technical feature of the present invention is not limited to the lens distortion model or the lens distortion correction algorithm. The lens distortion model or the lens distortion correction algorithm is well known to those skilled in the art, and thus, its detailed description is omitted.

The lane detector 130 may be configured to detect at least two mark lines marked on the road surface from the front, rear, left, and right images $CI_{front}$, $CI_{back}$, $CI_{left}$, and $CI_{right}$ input from the lens distortion corrector 120. Here, the mark lines may be mostly divided into a mark line parallel to a vertical axis (or a vehicle driving direction) of the vehicle and a mark line vertical to a vertical axis of the vehicle. The mark line parallel to the vertical axis of the vehicle may be, for example, a lane. The mark line vertical to the vertical axis of the vehicle may be, for example, a stop line, a parking mark line, or the like.

In a case where the mark lines are divided into the mark line parallel to the vertical axis of the vehicle and the mark line vertical to the vertical axis of the vehicle, the mark line (for example, the lane) parallel to the vertical axis of the vehicle may be detected from each of the front and rear images $CI_{front}$ and $CI_{back}$, and the mark line (for example, the stop line, the parking mark line, or the like) vertical to the vertical axis of the vehicle may be detected from each of the left and right images $CI_{left}$ and $CI_{right}$.

A method of detecting at least two lanes from each of the front, rear, left, and right images $CI_{front}$, $CI_{back}$, $CI_{left}$, and $CI_{right}$ may use a lane detection algorithm, and the present invention is not limited to the lane detection algorithm. The lane detection algorithm is well known to those skilled in the art, and thus, its detailed description is omitted. Hereinafter, in order to help understand description, it is assumed that the lane detector 130 detects two lanes from each of the front, rear, left, and right images $CI_{front}$, $CI_{back}$, $CI_{left}$, and $CI_{right}$ without differentiating the lane, the stop line, and the parking mark line.

The vanishing point detector 140 may be configured to extend the two lanes detected from each of the front, rear, left, and right images $CI_{front}$, $CI_{back}$, $CI_{left}$, and $CI_{right}$ by the lane detector 130 and may be configured to detect a vanishing point $VP_{front}$, $VP_{back}$, $VP_{left}$, or $VP_{right}$ at which the two extended lanes intersect. Here, the detected vanishing point may include vanishing point coordinates in an image coordinate system.

The rotation angle calculator 150 may be configured to calculate (or estimate) a rotation angle of each of the cameras 112, 114, 116, and 118 for compensating for a camera tolerance, based on the vanishing point detected by the vanishing point detector 140 for each of the front, rear, left, and right images $CI_{front}$, $CI_{back}$, $CI_{left}$, and $CI_{right}$, thereby generating second rotation angles $[\theta_2]_{front}$, $[\theta_2]_{back}$, $[\theta_2]_{left}$, and $[\theta_2]_{right}$ of the respective cameras 112, 114, 116, and 118.

Figure 2:
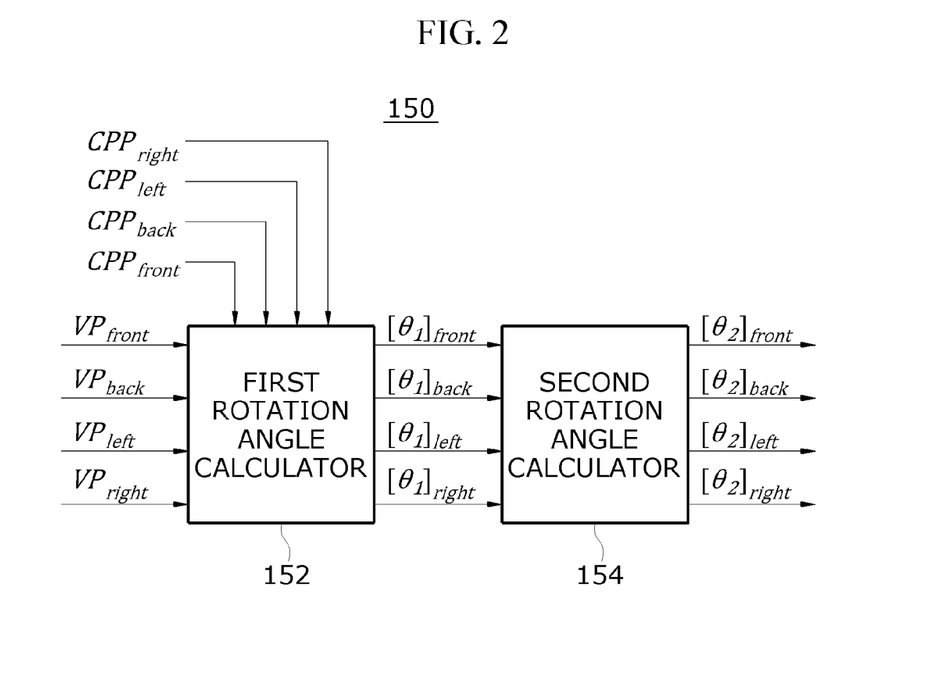
FIG. 2 is a function block diagram of a rotation angle calculator illustrated in FIG. 1.

That is, as illustrated in FIG. 2, the rotation angle calculator 150 may include a first rotation angle calculator 152 and a second rotation angle calculator 154.

Figure 3:
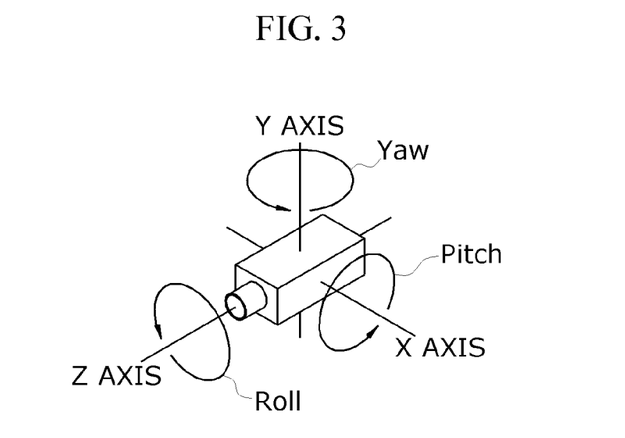
FIG. 3 is a diagram schematically illustrating a pitch direction, a roll direction, and a yaw direction defined in a camera coordinate system according to an exemplary embodiment.

Referring to FIG. 2, the first rotation angle calculator 152 may calculate a first rotation angle $[\theta_1]_{front}$ which moves a vanishing point $VP_{front}$, at which two lanes detected from the front image $CI_{front}$ intersect, to a camera principal point $CPP_{front}$ of the front camera 112 which is previously known. Here, the first rotation angle $[\theta_1]_{front}$ may include at least one of the amount of pitch-direction rotation, the amount of yaw-direction rotation, and the amount of roll-direction rotation. FIG. 3 schematically illustrates a pitch direction, a roll direction, and a yaw direction defined in a camera coordinate system. In FIG. 3, if an optical axis of a camera is a Z axis in a three-dimensional (3D) rectangular coordinate system including an X axis, a Y axis, and a Z axis, the pitch direction may be a rotation direction where rotation is performed with respect to the X axis, the yaw direction may be a rotation direction where rotation is performed with respect to the Y axis, and the roll direction may be a rotation direction where rotation is performed with respect to the Z axis.

A method of calculating a rotation angle moving the vanishing point $VP_{front}$ to the camera principal point $CPP_{front}$ may use a homography used for a geometric analysis of an image. The homography denotes a constant conversion relationship which is made between projected correspondence points when one plane is projected on another plane. The homography may be expressed as a 3×3 matrix and may be a conversion relationship which is established for a homogenous coordinate expression of correspondence points.

Similarly to a method of calculating the first rotation angle $[\theta_1]_{front}$ by using the vanishing point $VP_{front}$ at which the two lanes detected from the front image $CI_{front}$ intersect, the first rotation angle calculator 152 may be configured to calculate first rotation angles $[\theta_1]_{back}$, $[\theta_1]_{left}$, and $[\theta_1]_{right}$ of the other images $CI_{back}$, $CI_{left}$, and $CI_{right}$. That is, the first rotation angle $[\theta_1]_{back}$ of the rear image $CI_{back}$ moving a vanishing point $VP_{back}$, at which the two lanes detected from the front image $CI_{back}$ intersect, to a previously known camera principal point $CPP_{back}$ of the rear camera 114 may be calculated, and the first rotation angle $[\theta_1]_{left}$ of the left image $CI_{left}$ moving a vanishing point $VP_{left}$, at which the two lanes detected from the front image $CI_{left}$ intersect, to a previously known camera principal point $CPP_{left}$ of the left camera 116 may be calculated. Also, the first rotation angle $[\theta_1]_{right}$ of the right image $CI_{right}$ moving a vanishing point $VP_{right}$, at which the two lanes detected from the front image $CI_{right}$ intersect, to a previously known camera principal point $CPP_{right}$ of the right camera 118 may be calculated.

The second rotation angle calculator 154 may be configured to calculate the second rotation angles $[\theta_2]_{front}$, $[\theta_2]_{back}$, $[\theta_2]_{left}$, and $[\theta_2]_{right}$ which allow a camera to face a road surface (allows an optical axis of the camera to be vertical the road surface), based on the first rotation angles $[\theta_1]_{front}$, $[\theta_1]_{back}$, $[\theta_1]_{left}$, and $[\theta_1]_{right}$ calculated by the first rotation angle calculator 152. Here, the second rotation angles may each include at least one of the amount of pitch-direction rotation, the amount of yaw-direction rotation, and the amount of roll-direction rotation.

That is, if a top-view image coordinate system is assumed to be expressed as a two-dimensional (2D) coordinate system including an X axis vertical to a lane and a Y axis parallel to the lane, the second rotation angle which allows a camera to face the road surface and includes the amount of pitch-direction rotation and the amount of yaw-direction rotation may be calculated based on the amount of pitch-direction rotation and the amount of yaw-direction rotation which are included in the first rotation angle, and the second rotation angle which allows a lane direction to be parallel to a Y axis of the top-view image coordinate system and includes the amount of roll-direction rotation may be calculated based on the amount of roll-direction rotation included in the first rotation angle.

Figure 4:
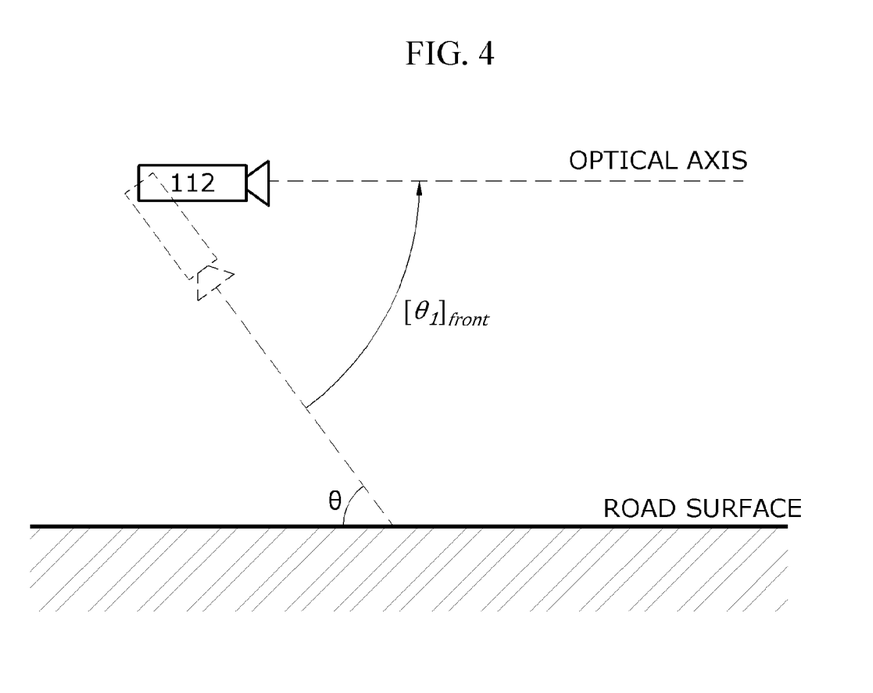
FIG. 4 is a diagram schematically illustrating a physical meaning of a camera rotation angle which moves a vanishing point to a camera principal point, according to an exemplary embodiment.
Figure 5:
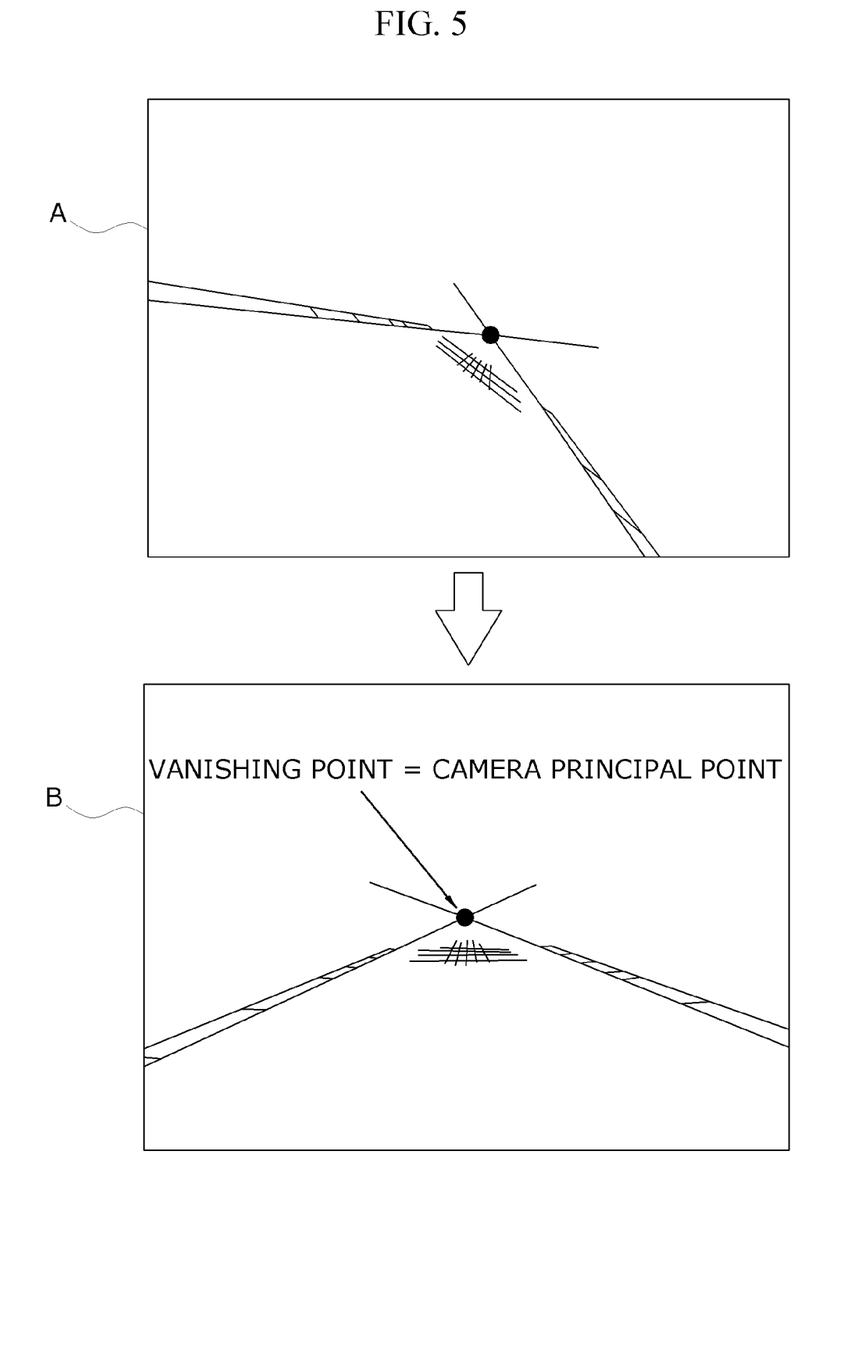
FIG. 5 is a diagram illustrating an example of an actually rotation-converted image generated by rotation-converting an actual input image at a first rotation angle which moves a vanishing point to a camera principal point in the input image, according to an exemplary embodiment.

The first rotation angle $[\theta_1]_{front}$ moving a vanishing point to a camera principal point, as illustrated in FIG. 4, denotes a rotation angle which allows the road surface to be parallel to an XZ plane including an X axis and a Z axis defined in a camera coordinate system. According to a geometric analysis of an image, if the road surface is parallel to the XZ plane defined in the camera coordinate system and the lane is parallel to a Z axis, a vanishing point detected from the front image $CI_{front}$ where lens distortion has been corrected may correspond to coordinates of a camera principal point. Since the vanishing point is a point at which two lanes which infinitely extend and intersect, a position of the vanishing point is not changed by a position movement of a camera but is changed by only a rotation change of the camera. FIG. 5 shows a photograph of an arbitrary front image A where lens distortion has been corrected and an actual photograph of an image B rotation-converted at the first rotation angle which moves a vanishing point to a camera principal point in the front image A.

If the first rotation angles $[\theta_1]_{front}$, $[\theta_1]_{back}$, $[\theta_1]_{left}$, and $[\theta_1]_{right}$ moving a vanishing point to a camera principal point are obtained (i.e., a rotation angle which allows the road surface to be parallel to the XZ plane or allows the road surface to be parallel to an optical axis of a camera) is obtained), the second rotation angle which allows a camera to face the road surface (allows an optical axis of a camera to be vertical to the road surface) may be simply calculated. That is, a viewpoint of an image rotation-converted at the first rotation angle and a viewpoint of an image rotation-converted at the second rotation angle have a 90-degree relationship, and the second rotation angle may be calculated from the first rotation angles, based on the 90-degree relationship.

Referring to FIG. 1, the image rotation unit 160 may be configured to respectively rotation-convert the lens distortion-corrected front, rear, left, and right images $CI_{front}$, $CI_{back}$, $CI_{left}$, and $CI_{right}$ into front, rear, left, and right top-view images $TI_{front}$, $TI_{back}$, $TI_{left}$, and $T_{right}$, based on the second rotation angles $[\theta_2]_{front}$, $[\theta_2]_{back}$, $[\theta_2]_{left}$, and $[\theta_2]_{right}$ input from the rotation angle calculator 150.

The image synthesizer 170 may be configured to synthesize the front, rear, left, and right top-view images $TI_{front}$, $TI_{back}$, $TI_{left}$, and $TI_{right}$ to generate a single top-view image TI. The single top-view image TI may be sequentially generated in units of one frame. In FIG. 1, $TI_n$ refers to a current top-view image generated from a current frame, and $TI_{n-1}$ refers to a previous top-view image generated from a previous frame.

The frame buffer 175 may store the previous top-view image $TI_{n-1}$ and may delay the previous top-view image $TI_{n-1}$ in order to the previous top-view image $TI_{n-1}$ to be output to the top-view image verifier 180 at the same time with a time when the current top-view image $TI_n$ is output to the top-view image verifier 180.

The top-view image verifier 180 may be configured to compare the previous top-view image with the current top-view image to verify a top-view image which is generated by the image synthesizer 170 in units of one frame.

That is, when the vehicle is driving straight, the top-view image verifier 180 may be configured to verify whether a lane direction of a lane detected from the previous top-view image matches a lane direction of a lane detected from the current top-view image $TI_n$. Here, the straight driving of the vehicle may be determined based on steering angle information obtained from a steering angle sensor of the vehicle.

Moreover, when the vehicle is driving straight, the top-view image verifier 180 may verify whether an interval between a lane detected from the previous top-view image $TI_{n-1}$ and a vertical axis of the vehicle matches an interval between a lane detected from the current top-view image $TI_n$ and the vertical axis of the vehicle.

Since the second rotation angle which calculated from the first rotation angle calculated based on the vanishing point in order for a camera to face the road surface is irrelevant to the vertical axis of the vehicle, alignment between the vertical axis of the vehicle and the top-view image coordinate system is needed. For the alignment between the vertical axis of the vehicle and the top-view image coordinate system, the top-view image verifier 180 may be configured to verify whether lane directions respectively detected from the continued images $TI_{n-1}$ and $TI_n$ match each other and a constant interval between the lane and the vertical axis of the vehicle is maintained in the continued images $TI_{n-1}$ and $TI_n$.

When it is verified that a constant lane direction and a constant interval (the interval between the lane and the vertical axis of the vehicle) are maintained in continuous frames, the top-view image verifier 180 may be configured to determine that the alignment between the vertical axis of the vehicle and the top-view image coordinate system is made and may provide the top-view image generated by the image synthesizer 170 to the display unit 190, and the display unit 190 may be configured to display the top-view image.

On the other hand, when it is verified that the lane direction or the interval (the interval between the lane and the vertical axis of the vehicle) are not maintained in the continuous frames, the top-view image verifier 180 may be configured to control the display unit 190 to stop an output of the top-view image.

As described above, according to an exemplary embodiment, the top-view image generating apparatus 100 may be configured to detect at least two lanes from an input image obtained by photographing a peripheral road surface of a vehicle when the vehicle is driving on a road, calculate (estimate) a first rotation angle of a camera for compensating for a camera tolerance by using a vanishing point at which the detected at least two lanes intersect, and calculate (estimate) a second rotation angle for converting the input image into a top-view image by using the calculated first rotation angle, thereby compensating for the camera tolerance in real time when the vehicle is driving on a road. Accordingly, inconvenience where a driver periodically visits a repair shop along with a vehicle and the repair shop compensates for the camera tolerance is reduced, and a camera tolerance may be compensated for in real time, thereby preventing the display quality of a top-view image from being degraded by the camera tolerance.

Figure 6A:
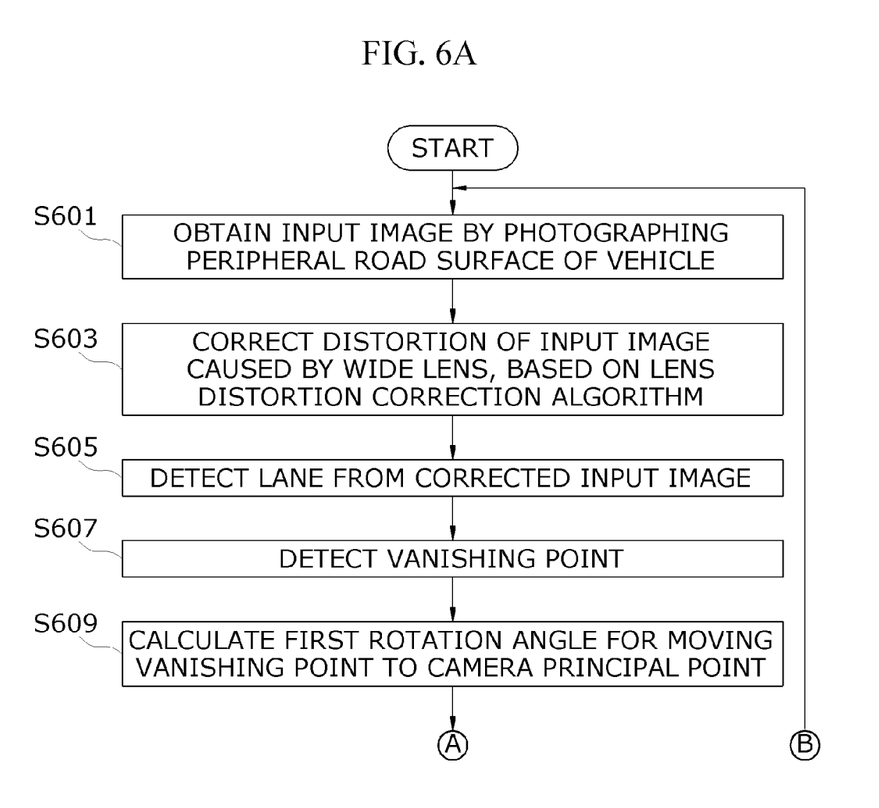
FIGS. 6A and 6B are flowcharts illustrating a top-view image generating method according to an exemplary embodiment.
Figure 6B:
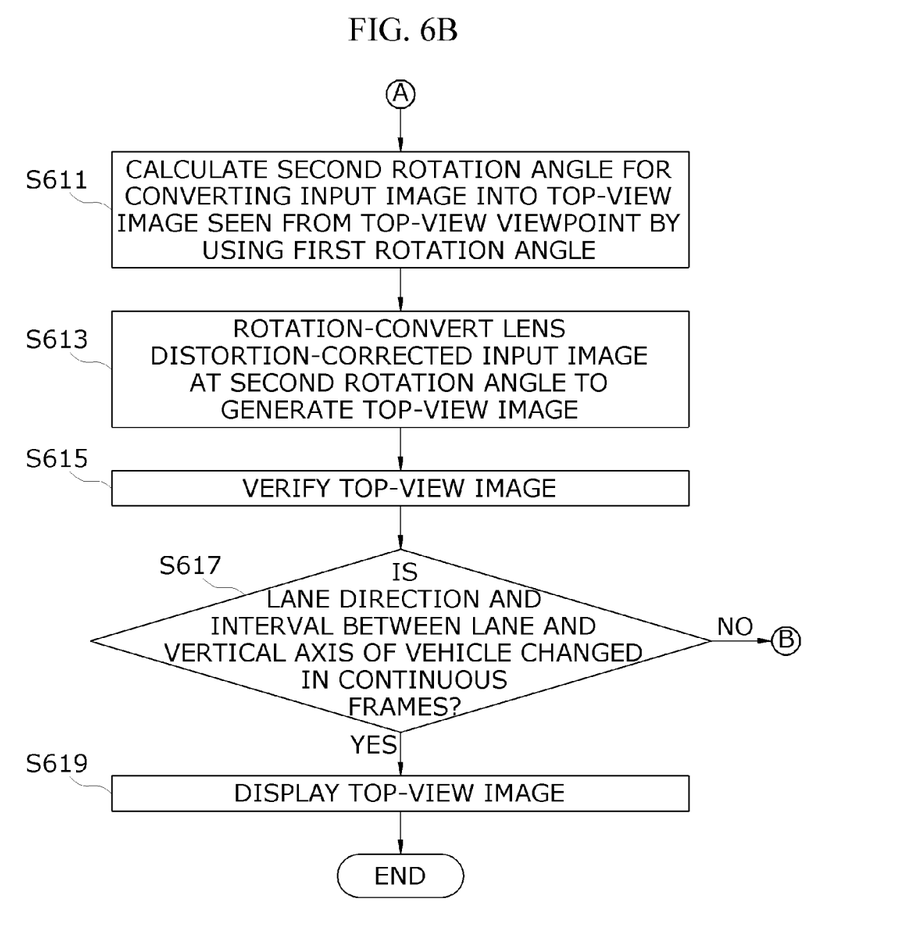

FIGS. 6A and 6B are flowcharts illustrating a top-view image generating method according to an exemplary embodiment of the present invention. In the following steps, details which are the same as or similar to the details described above with reference to FIGS. 1, 2, 3, 4, and 5 will be briefly described or are omitted.

Referring to FIGS. 6A and 6B, first, in step S601, an operation of obtaining input images $I_{front}$, $I_{back}$, $I_{left}$, and $I_{right}$ obtained by photographing a peripheral road surface of a vehicle by using the cameras 112, 114, 116, and 118 installed in the vehicle may be performed when the vehicle is actually driving on a road.

Subsequently, in step S603, an operation of correcting distortion of the input images caused by a wide lens may be performed based on the lens distortion correction algorithm (the lens distortion model).

Subsequently, in step S605, an operation of detecting at least two lanes from each of input images $CI_{front}$, $CI_{back}$, $CI_{left}$, and $CI_{right}$ where the lens distortion has been corrected may be performed.

Subsequently, in step S607, an operation of detecting a vanishing point $VP_{front}$, $VP_{back}$, $VP_{left}$, or $VP_{right}$ at which the detected at least two lanes intersect may be performed.

Subsequently, in step S609, an operation of calculating first rotation angles $[\theta_1]_{front}$, $[\theta_1]_{back}$, $[\theta_1]_{left}$, and $[\theta_1]_{right}$ for moving the vanishing points $VP_{front}$, $VP_{back}$, $VP_{left}$, and $VP_{right}$ to camera principal points $CPP_{front}$, $CPP_{back}$, $CPP_{left}$, and $CPP_{right}$ may be performed.

Subsequently, in step S611, an operation of calculating second rotation angles $[\theta_2]_{front}$, $[\theta_2]_{back}$, $[\theta_2]_{left}$, and $[\theta_2]_{right}$ for converting the input images into a top-view image seen from a top-view viewpoint by using the first rotation angles may be performed.

Subsequently, in step S613, an operation of rotation-converting the lens distortion-corrected input images $CI_{front}$, $CI_{back}$, $CI_{left}$, and $CI_{right}$ at the second rotation angles and synthesizing the rotation-converted images to generate a single top-view image TI may be performed.

Subsequently, in step S615, an operation of verifying the top-view image for alignment between a vertical axis of the vehicle and the top-view image coordinate system may be performed. As such, when the vehicle is driving straight, the top-view image verifier 180 may be configured to verify whether a lane direction of a lane detected from a previous top-view image $TI_{n-1}$ matches a lane direction of a lane detected from a current top-view image $TI_n$. When the vehicle is driving straight, the top-view image verifier 180 may be configured to verify whether an interval between a lane detected from the previous top-view image $TI_n$-1 and a vertical axis of the vehicle matches an interval between a lane detected from the current top-view image $TI_n$ and the vertical axis of the vehicle.

Subsequently, in step S617, when a lane direction in a previous frame matches a lane direction in a current frame and an interval (an interval between the lane and the vertical axis of the vehicle) in the previous frame matches an interval (an interval between the lane and the vertical axis of the vehicle) in the current frame, namely, when a lane direction or an interval (an interval between the lane and the vertical axis of the vehicle) is not changed in continuous frames, an operation of determining that the vertical axis of the vehicle and the top-view image coordinate system are aligned may be performed, and in step S619, an operation of displaying a corresponding top-view image in the display unit 190 may be performed.

On the other hand, when the lane direction in the previous frame does not match the lane direction in the current frame and the interval (the interval between the lane and the vertical axis of the vehicle) in the previous frame does not match the interval (the interval between the lane and the vertical axis of the vehicle) in the current frame, namely, when the lane direction and the interval (the interval between the lane and the vertical axis of the vehicle) are changed in the continuous frames, it is determined that the vertical axis of the vehicle and the top-view image coordinate system are not aligned, the operation of displaying the corresponding top-view image may be stopped, and steps S601 to S615 may be again performed.

As described above, the top-view image generating apparatus and method according to an exemplary embodiment of the present invention may estimate a rotation angle of a camera by using a vanishing point even when a vehicle is actually driving, and may compensate for a camera tolerance by using the estimated rotation angle, thereby solving inconvenience where a driver directly visits an auto service and repair shop for compensating for the camera tolerance and improving registration of a top-view image.

The block diagrams of FIGS. 1 and 2 illustrating the top-view image generating apparatus 100 according to an exemplary embodiment are to be understood to represent a conceptual point of view that embody the inventive concepts of the present invention. Similarly, it should be understood that the flowcharts of FIGS. 6A and 6B are substantially representable in a computer-readable medium and represent various processes performed by a computer or a processor irrespective of whether the computer or the processor is clearly shown or not.

The blocks of FIGS. 1 and 2 illustrated as a processor or a similar concept may be provided by the use of software as well as dedicated hardware.

When the blocks of FIGS. 1 and 2 are implemented by a processor, functions of the blocks illustrated in FIGS. 1 and 2 may be provided by a single dedicated processor, a single shared processor, or a plurality of individual processors, and some of the blocks may be shared.

In addition, the use of control processor, or similar terms that are presented as a concept is not to be construed quoted exclusive of hardware, with the ability to run the software, and it should be understood as implicitly including a read-only memory (ROM), a random access memory (RAM), and a nonvolatile memory for storing processor-executable instructions in a digital signal processor (DSP), hardware, and software, without limitation. Also, other well-known hardware may be included.

According to the exemplary embodiments of the present invention, a camera tolerance may be compensated for in real time when a vehicle is driving on a road, thereby reducing inconvenience that a driver periodically visits a repair shop along with a vehicle and the repair shop compensates for the camera tolerance.

Moreover, according to the exemplary embodiments of the present invention, a camera tolerance may be compensated for in real time, thereby preventing the display quality of a top-view image from being degraded by the camera tolerance.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of generating a top-view image, comprising:
obtaining an input image by photographing a peripheral road surface of a vehicle by using a camera when the vehicle is driving;
detecting at least two lanes from the input image;
detecting a vanishing point at which the at least two lanes intersect;
calculating a first rotation angle of the camera by using the vanishing point;
calculating a second rotation angle of the camera for converting the input image into a top-view image represented in a top-view image coordinate system, based on the first rotation angle;
rotation-converting the input image by using the second rotation angle to generate the top-view image; and verifying the top-view image for alignment between a vertical axis of the vehicle and the top-view image coordinate system after the generating of the top-view image;
wherein the verifying of the top-view image comprises:
detecting a lane from a previous top-view image generated from a previous frame and detecting a lane from a current top-view image generated from a current frame;
determining whether a direction of the lane detected from the previous top-view image matches a direction of the lane detected from the current top-view image;
determining whether an interval between the lane detected from the previous top-view image and the vertical axis of the vehicle matches an interval between the lane detected from the current top-view image and the vertical axis of the vehicle; and
determining the alignment as being made between the vertical axis of the vehicle and the top-view image coordinate system when the direction of the lane detected from the previous top-view image matches the direction of the lane detected from the current top-view image, and the interval between the lane detected from the previous top-view image and the vertical axis of the vehicle matches the interval between the lane detected from the current top-view image and the vertical axis of the vehicle.

2. The method of claim 1, wherein the calculating of the first rotation angle comprises calculating the first rotation angle for moving the vanishing point to a camera principal point of the camera.

3. The method of claim 1, wherein:
the calculating of the first rotation angle enables a road surface to be parallel to an XZ plane, and
the XZ plane comprises an X axis and a Z axis in a camera coordinate system that defines a pitch direction is a rotation direction where rotation is performed with respect to the X axis, a yaw direction is a rotation direction where rotation is performed with respect to a Y axis, and a roll direction is a rotation direction where rotation is performed with respect to the Z axis which is an optical axis of the camera.

4. The method of claim 1, wherein the calculating of the second rotation angle comprises:
when the top-view image coordinate system is expressed as a two-dimensional (2D) coordinate system comprising an X axis vertical to a lane and a Y axis parallel to the lane,
calculating an amount of yaw-direction rotation and an amount of pitch-direction rotation enabling the camera to face a road surface, based on an amount of pitch-direction rotation and an amount of yaw-direction rotation included in the first rotation angle; and
calculating an amount of roll-direction rotation enabling a lane direction to be parallel to the Y axis of the top-view image coordinate system, based on an amount of roll-direction rotation included in the first rotation angle.

5. An apparatus for generating a top-view image, the apparatus comprising:
a camera configured to obtain input images by photographing a peripheral road surface of a vehicle when the vehicle is driving;
a lane detector configured to detect at least two lanes from each of the input images;
a vanishing point detector configured to detect a vanishing point at which the at least two lanes intersect;
a rotation angle calculator configured to calculate a rotation angle for converting each of the input images into an image corresponding to a top-view viewpoint by using the vanishing point;
an image rotation unit configured to rotation-converting the input images by using the rotation angle;
an image synthesizer configured to synthesize the input images rotation-converted at the rotation angle to generate a top-view image; and
a top-view image verifier configured to verify the top-view image for alignment between a vertical axis of the vehicle and the top-view image coordinate system;
wherein the top-view image verifier is configured to verify whether the alignment between the vertical axis of the vehicle and the top-view image coordinate system is made, based on a previous top-view image of a previous frame and a current top-view image of a current frame.

6. The apparatus of claim 5, wherein the rotation angle calculator comprises:
a first rotation angle calculator configured to calculate a first rotation angle for moving the vanishing point to a camera principal point of the camera; and
a second rotation angle calculator configured to calculate a second rotation angle for converting each of the input images into an image represented in a top-view image coordinate system, based on the first rotation angle.

7. The apparatus of claim 6, wherein the first rotation angle calculator calculates the first rotation angle, which allows a road surface to be parallel to an XZ plane comprising an X axis and a Z axis, in a camera coordinate system which defines a pitch direction is a rotation direction where rotation is performed with respect to the X axis, a yaw direction is a rotation direction where rotation is performed with respect to a Y axis, and a roll direction is a rotation direction where rotation is performed with respect to the Z axis which is an optical axis of the camera.

8. The apparatus of claim 6, wherein when the top-view image coordinate system expressed as a two-dimensional (2D) coordinate system comprising an X axis vertical to a lane and a Y axis parallel to the lane, the second rotation angle calculator calculates an amount of yaw-direction rotation and an amount of pitch-direction rotation enabling the camera to face the road surface, based on an amount of pitch-direction rotation and an amount of yaw-direction rotation in the first rotation angle, and calculates an amount of roll-direction rotation enabling a lane direction to be parallel to the Y axis of the top-view image coordinate system, based on an amount of roll-direction rotation in the first rotation angle.

9. The apparatus of claim 5, wherein the top-view image verifier is configured to determine whether a direction of the lane detected from the previous top-view image matches a direction of a lane detected from the current top-view image and an interval between the lane detected from the previous top-view image and the vertical axis of the vehicle matches an interval between the lane detected from the current top-view image and the vertical axis of the vehicle, and verify whether the alignment between a vertical axis of the vehicle and the top-view image coordinate system is made.

* * * * *